United States Patent [19]

Bovio et al.

[11] 4,372,694

[45] Feb. 8, 1983

[54] ELECTRONIC POCKET CALCULATOR

[75] Inventors: Michele Bovio, Brosso; Filippo Demonte, Cavaller Maggiore, both of Italy

[73] Assignee: Ing. C. Olivetti & Co., S.p.A., Ivrea, Italy

[21] Appl. No.: 223,166

[22] Filed: Jan. 7, 1981

[30] Foreign Application Priority Data

Jan. 18, 1980 [IT] Italy .............. 67067 A/80

[51] Int. Cl.³ .............................................. B41J 3/36
[52] U.S. Cl. .................................... 400/88; 400/54;
400/613.1; 364/708; 364/710
[58] Field of Search ................. 400/88, 120, 54, 613,
400/613.1, 630, 632, 632.1, 668, 617, 124;
354/187; 364/707, 708, 710

[56] References Cited

U.S. PATENT DOCUMENTS

| Re. 29,832 | 11/1978 | Hayakawa | 400/120 X |
|---|---|---|---|
| 3,682,407 | 8/1972 | Lichtenstein et al. | 400/613 X |
| 3,732,963 | 5/1973 | Kraayenhof et al. | 400/613 X |
| 3,823,808 | 7/1974 | Murata et al. | 400/613 |
| 3,885,661 | 5/1975 | Okabe | 400/120 X |
| 4,002,892 | 1/1977 | Zielinski | 364/708 |
| 4,143,382 | 3/1979 | Brill et al. | 400/88 X |
| 4,175,876 | 11/1979 | Hanaoka | 400/124 |
| 4,189,222 | 2/1980 | Maitani | 354/187 X |
| 4,253,774 | 3/1981 | Hanakata et al. | 400/88 X |

FOREIGN PATENT DOCUMENTS

| 2019606 | 11/1971 | Fed. Rep. of Germany | 400/613 |
|---|---|---|---|
| 2108522 | 9/1972 | Fed. Rep. of Germany | 364/708 |
| 2842654 | 4/1979 | Fed. Rep. of Germany | 364/710 |
| 54-144151 | 11/1979 | Japan | 364/707 |

*Primary Examiner*—Paul T. Sewell
*Assistant Examiner*—Daniel J. Roock
*Attorney, Agent, or Firm*—Schuyler, Banner, Birch, McKie & Beckett

[57] ABSTRACT

The calculator is small enough and well protected enough to be carried in the pocket. In addition to a keyboard 28, circuit board 29, batteries 18 and an LCD data display 91, there is a printer comprising a platen 36 which draws paper from a roll in a compartment 101. A thermal printing head 33 is reciprocated along the writing line by a pin 44 engaging in an eccentric cam groove in a disc 46 rotated by a crown wheel 53 and a pinion 54 on the shaft of a motor. Another cam-follower pin 64 reciprocates a slide 66 which advances the platen incrementally after each traverse of the head 33. A slidable cover 14 is shown open, exposing the printing mechanism and operating a switch which enables the printer. Results appear on the LCD display and are printed. When the cover is slid closed it protects the printing mechanism and disables it via the switch. The calculator can nevertheless be used without the printer, results being displayed only on the LCD display 91. The paper roll is carried in a removable container 132 to which access is obtained by depressing a detent tongue and sliding the cover still further open. Cooperating parts of the container and the calculator frame guide the leading strip of the paper between the platen and print head. When the cover is closed it bends a tongue of the container to nip the paper and immobilize it.

12 Claims, 10 Drawing Figures

ELECTRONIC POCKET CALCULATOR

BACKGROUND OF THE INVENTION

The present invention relates to a printing electronic calculator which can be made so small that it can be carried around in a user's pocket.

Printing electronic calculators small enough to be easily transportable are known. These, however, require a supplementary carrying case or bag to facilitate transport and protect the printing unit. The dimensions of these calculators are moreover still not sufficiently small for them to be accommodated in a user's pocket.

SUMMARY OF THE INVENTION

Therefore, the object of the present invention is to provide a printing electronic calculator wherein the printing unit is protected from contamination and shocks or impact, whereby the calculator can be safely carried in the pocket.

The invention is defined in claim 1, to which reference should now be made.

To achieve miniaturisation, the dimensions of the printer described below have been considerably reduced, while maintaining, however, a printing line of sufficient length for clear reading and a high capacity both as regards hours of operation with an independent supply and as regards the number of digits which can be represented in the printing line. According to another characteristic of the described calculator, the printing unit comprises a toothed wheel connected to the platen, a cam of the slotted link type carried by the same rotating member which shifts the head, and a slider having a flexible tongue which advances the toothed wheel and, therefore, the platen incrementally.

Use of the calculator is made particularly simple by the creation of a container for the roll of paper which facilitiates each operation of replacement of the roll itself.

DESCRIPTION OF THE DRAWING

The invention will be described in more detail, by way of example, with reference to the accompanying drawings in which.

DESCRIPTION OF THE PREFERRED EMBODIMENT

Figure 1:
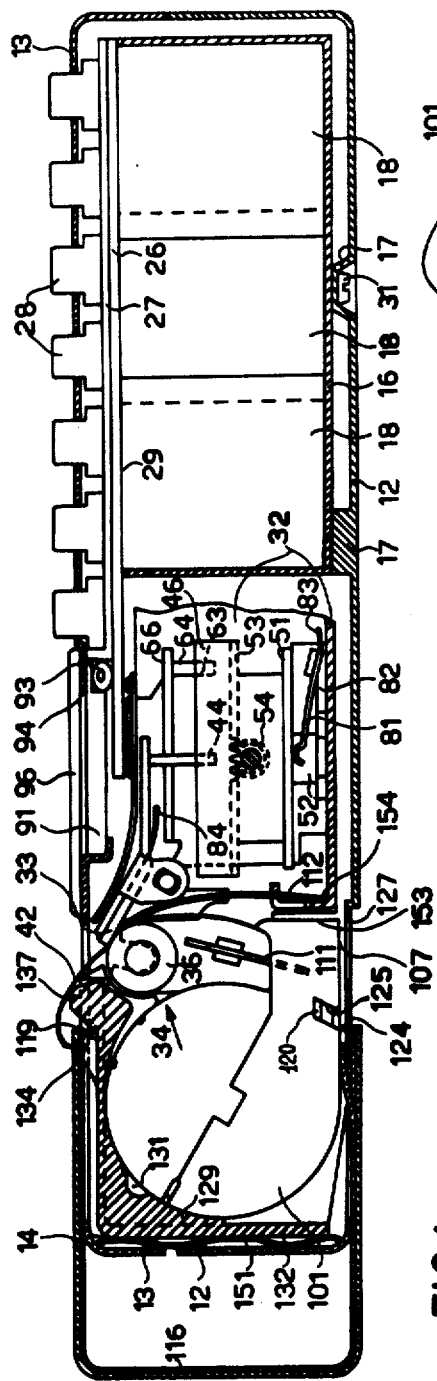
FIG. 1 is a partial longitudinal section of a printing electronic calculator embodying the invention.
Figure 10:
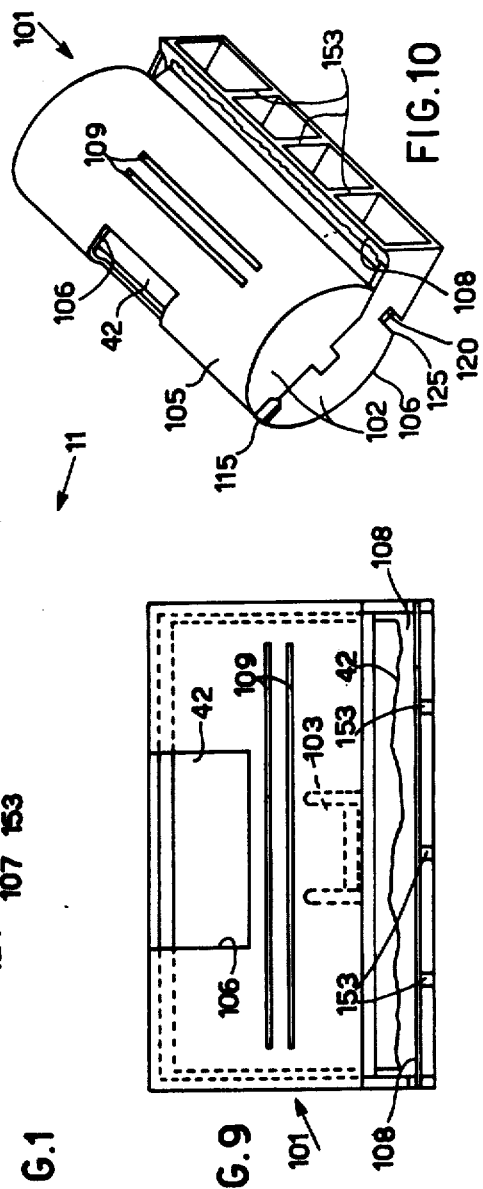
FIG. 10 is a perspective view of the part of FIG. 9.

Referring to FIG. 1, the pocket electronic calculator 11 comprises a body having a base 12, a top cover 13 and a movable cover 14. The base 12 is of substantially parallelepipedal form and is adapted to accommodate a battery hold 16. The holder 16 is disposed on bottom shoulders 17 of the base 12 and houses an independent supply consistituted by eight rechargeable batteries 18, for example each of the 1.2 volt type. The side walls 21 and 22 (FIG. 2) of the base 12 and the top cover 13 are slightly set back so as to allow the sides 23 and 24 of the movable cover 14 to lie in the same plane as the side walls 21 and 22.

The top cover 13 (FIG. 1) is fixed to a plate 26 supporting, on one side, a keyboard 27 for entering digits and symbols by means of keys 28, and, on the other side, a printed circuit 29. To the circuit 29 are fixed the integrated components of the control unit of low absorption type, which control the various functions of the calculator 11, and the connecting elements in contact with the eight batteries 18. The details of the plate 26, the keyboard 27 and the various components are outside the objects of the present application and are shown only diagrammatically in the drawings and are not described.

Two screws 31 hold together the base 12, the battery holder 16, the top cover 13 and a frame 32 on which is mounted a printing device 33 employed in a printing unit 34 and the working principles of which are substantially the same as those described in U.S. Pat. No. 4,238,806.

The printing unit 34 comprises a platen 36 rotatable by means of pivots 37 and 38 (FIG. 2) in two side portions 39 and 41 of the frame 32. The platen 36 supports a recording medium 42 (FIG. 1) constituted by a strip of paper against which there normally bears a thermal printing head 33 fast with a head slide or support 43. The slide 43 (FIG. 4) is movable transversely with respect to the paper 42 with a reciprocating movement produced by a cam profile 44 (FIG. 2) of a rotating member 46 and a cam-following pin 47 fast with the slide 43. A leaf spring 48 fixed to the side portion 41 and to another side portion 50 of the frame 32 holds the head 33 (FIG. 4) in contact with the paper 42. The slide 43 is guided transversely of the platen by a shaft 49 fixed to the side portions 39 and 41 (FIG. 2) of the frame 32.

The rotating member 46 (FIG. 4) is pivoted on a pin 52 on the frame 32 and comprises a crown gear 53 which is always in mesh with a pinion 54 of an electric motor 61 (FIG. 2) supported parallel to the platen 36 by a flange 62 of the frame 32. The crown gear 53 is parallel to the platen 36 and the transverse dimensions of the motor 61 and the member 46 do not substantially exceed those of the platen 36. The rotating member 46 also comprises a strobe disc 51 (FIG. 4) and a second cam profile 63 of the slotted link type adapted to cooperate with a cam-following pin 64 of a line-spacing control slide or slider 66.

Figure 2:
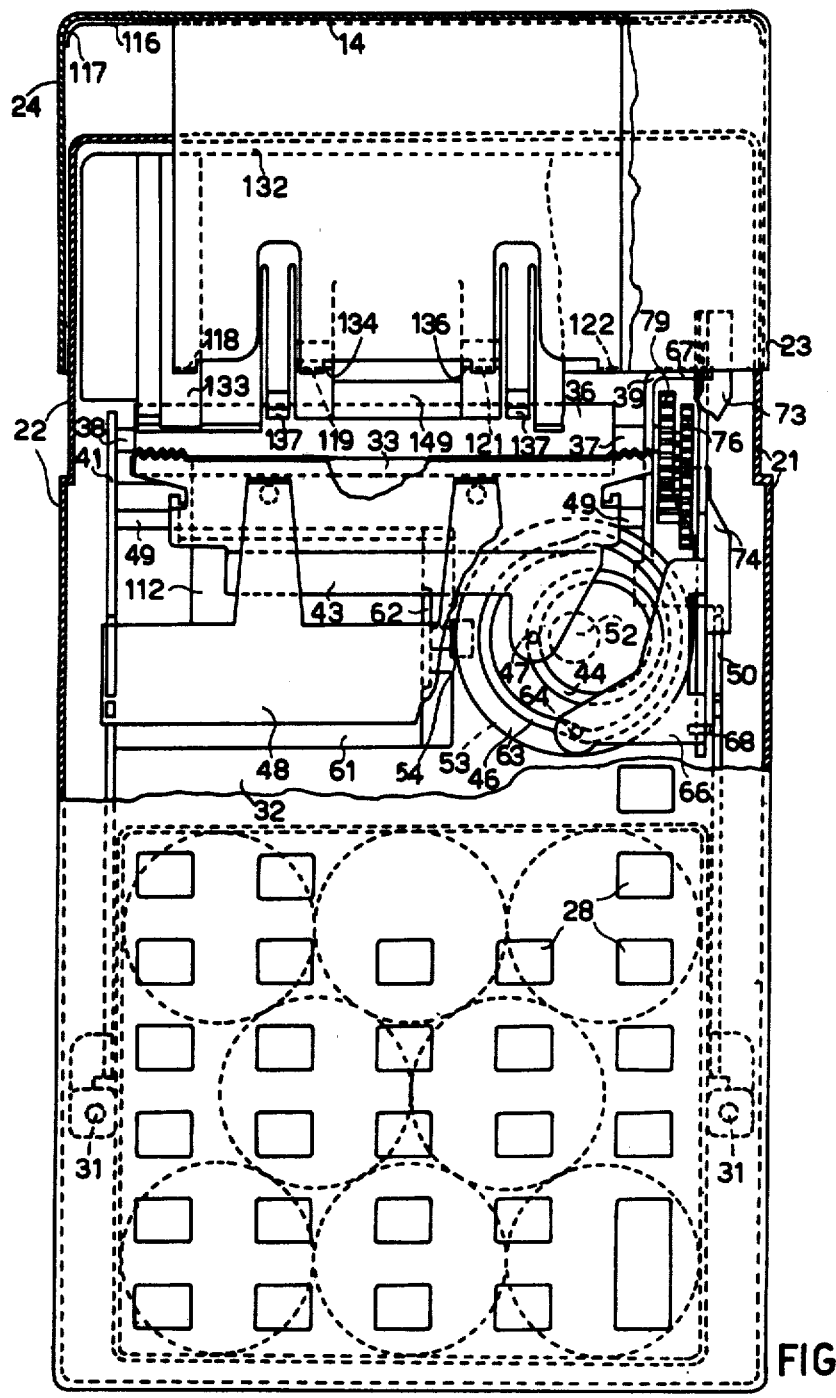
FIG. 2 is a partial plan view of the calculator of FIG. 1.
Figure 7:
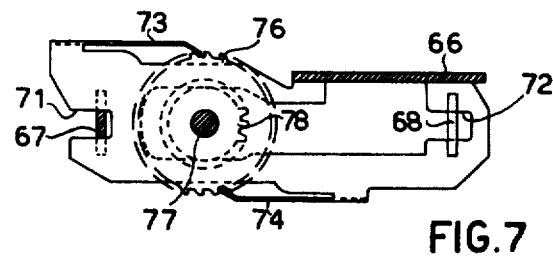
FIG. 7 is a partial view of other details of the calculator of FIG. 1.

The line-spacing control slide 66 is guided by a lug 67 (FIG. 2) of the side portion 39 and by a lug 68 of the side portion 50, the lugs being seated in two slots 71 and 72 (FIG. 7) in the slide 66, which is movable perpendicularly to the platen 36 (FIG. 2). By means of two flexible tongues 73 and 74 (FIG. 7), the slide 66 is adapted to cooperate with a toothed wheel 76. The flexible tongues 73 and 74 are disposed diametrically opposed with respect to the wheel 76, which can rotate on a pivot 77 on the side portion 39 (FIG. 2) and is integral with a transmission wheel 78 constantly in mesh with a toothed wheel 79 fast with the pivot 37 of the platen 36. The flexible tongues 73 and 74 selectively engage a tooth of the wheel 76, whereby the wheel 76 is caused to rotate incrementally during the forward travel by the lug 73 and during the return travel by the lug 74. Through the medium of the cam-following pin 64, the slide 66, the flexible tongues 73 and 74 and the toothed wheels 76, 78 and 79, the second cam profile 63 commands the intermittent rotation of the platen 36 at the end of each travel of the slide 43.

The strobe disc 51 (FIG. 4) fast with the rotating member 46 having the cam profiles 44 and 63 is connected to the circuit 29 (FIG. 1) through the medium of four leaf springs 81 fixed to a support 82 of the frame 32 and of a corresponding electric cable 83 in order to send signals for synchronizing the movement of the head 33 and the cam profiles 44 and 63.

The thermal head 33 comprises a rectangular plate with a series of conductors substantially like those described in the before-mentioned U.S. Pat. No. 4,238,806 and is therefore not described in detail. The head 33 is connected to the circuit 29 by means of a flexible multiple cable 84.

The circuit 29 controls a visual display 91, for example a liquid crystal display, which is known per se and not described in detail, for digits and symbols, the display being borne on top of and against an L-shaped shoulder 92 (FIG. 4) of the top cover 13 by the action of a small spring 93. The visual display 91 is disposed below a window 94 in the cover 13 which is closed on top by a glass plate 96 which allows the operator to read the data. On the display 91 (FIG. 3) there are visible twenty-four digits and symbols 97 as represented for example in FIG. 3 and a series of guide signs or indicators 98 such as: DEC, R/O, PRT, ACC, AP and PR. OUT. The guide signs DEC (decimals) and R/O (rounding off) appear flashing when the keys are operated for entering either decimals or roundings off, the signs PRT (printing), ACC (accumulation) and PR. OUT (non-print) remain on the display 91 for a predetermined period of time when the keys are actuated for operations related to the signs. Finally the signs A (antemeridian) and P (postmeridian) relate to operation as a clock and appear alternatively on the display 91 in the first or second twelve hours of the day, together with the indication of hours, minutes and seconds, when the calculator is not operative.

Figure 4:
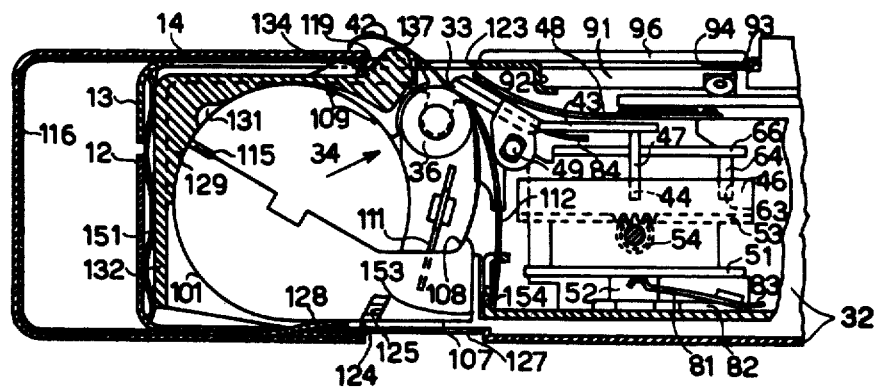
FIG. 4 is a partial longitudinal section of some parts at the left of the calculator as shown in FIG. 1.
Figure 5:
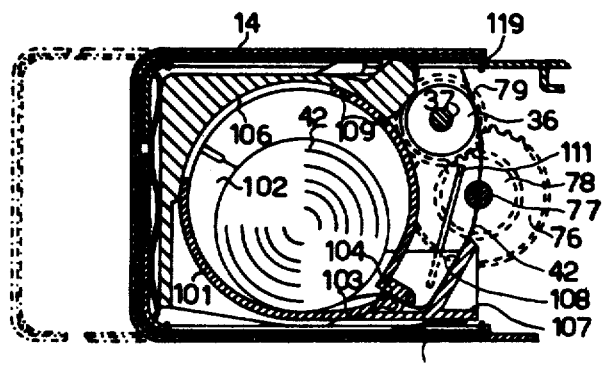
FIG. 5 is a partial longitudinal section of other parts at the left of the calculator of FIG. 1.

The roll of paper 42 (FIG. 4) is accommodated in a container 101 of substantially cylindrical shape which is closed at the sides by two semicircular walls 102. The container 101 comprises a flexible central strip or tongue 103 (FIG. 5) adapted to cooperate with a lip 104 which, when the tongue is closed, as shown in FIG. 5, bends the tongue 103 and nips the strip of paper 42 between the lip 104 and the tongue 103. The container 101 has an access window 106 adapted to allow insertion or removal of the paper 42 when the container 101 is removed from the machine, and a flat portion or flap 107 having an inner rib 108 for guiding the paper 42 towards the platen 36. Finally, the container 101 has two notches or slots 109 adapted to define the length of paper 42 outside the container 101 in order to facilitate the mounting of the container itself in the calculator 11 as described hereunder. The paper 42 is guided by the tongue 103, the lip 104, the rib 108, a guide 111 and a paper-holding strip element 112 (FIG. 4) of the frame 32 towards the platen 36.

Figure 8:
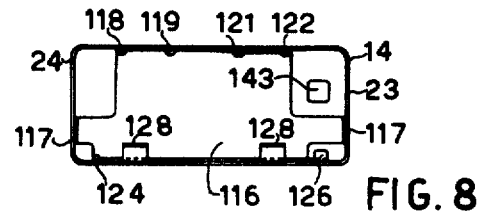
FIG. 8 is a partial front view of other details of the calculator of FIG. 1.

The movable cover 14 has a substantially parallelepipedal shape adapted to accommodate a cover stop 116 constituted by a thin flexible plate having two lugs 117 (FIG. 8) adapted to cooperate in turn with the inside of the sides 23 and 24 of the cover 14 to secure the stop 116 to the cover itself. The stop 116 comprises four upper lugs 118, 119, 121 and 122 adapted to be accommodated in a slot 123 (FIG. 4) in the top cover 13 and two lower lugs 124 and 126 (FIG. 8) adapted to be accommodated in a slot 127 (FIG. 4) in the base 12. Finally, the cover 116 comprises two flexible tongues 128 which bear on the lower face of the flat portion 107 of the container 101 to hold the container against two shoulders 129 and 131 of a housing or rear support 132.

Figure 6:
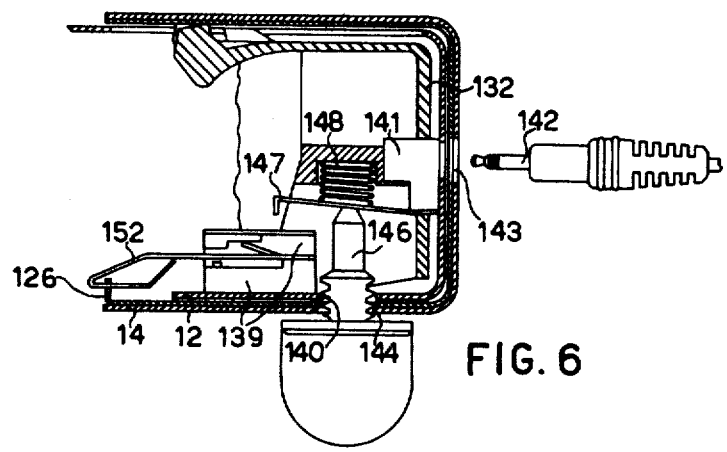
FIG. 6 is a partial longitudinal section of other details at the right of the calculator of FIG. 1.

The rear support 132 is accommodated between the base 12 and the top cover 13 and comprises two grooves 133 (FIG. 2) adapted to receive the lugs 118 and 122, two shoulders 134 and 136 adapted to cooperate with the lugs 119 and 121, and two flexible tongues 137. These tongues 137 are adapted to cooperate with the cover stop 116 during the shifting of the movable cover 14 to pass from the position of FIG. 1 to that of FIG. 5 and vice versa. The rear support 132 has two side portions 138 (FIG. 3) adapted to define the transverse position of the container 101 in the calculator 11, and a seat for accommodating a switch 139 (FIG. 6). This switch 139 is connected to the circuit 29 (FIG. 1) by means of electric wires not shown in the drawings and is adapted to cooperate with the lug 126 (FIG. 6) when the movable cover 14 is in the working position to enable the calculator 11 to print the desired data on the paper 42. The support 132 moreover bears an electric socket 141 for allowing insertion of a plug 142 for recharging the batteries 18 (FIG. 1) through a hole 143 (FIG. 6) in the cover 14. Moreover, a hole 140 and a hole 144 are formed in the bottom part of the base 12 and in the cover 14, respectively, these holes being mutually aligned in the inoperative position of the cover 14. When the two holes 140 and 144 are aligned, they allow the passage of a plug 146 adapted to shift a switch 147 opposed by a spring 148 for disconnecting the batteries 18 (FIG. 1) from the circuit 29 when the calculator 11 is stored with the cover 14 in the inoperative position. The switch 147 (FIG. 6) moreover enables the operator to reset all the data entered in the calculator 11 when this shows any abnormal working through a time correction.

The rear support 132 (FIG. 2) has between its shoulders 134 and 136 a projection 149 adapted to allow the operator to bend it manually to disengage the shoulders 134 and 136 from the respective lugs 119 and 121. This enables the movable cover 14 to perform an extra travel with the cover stop 116 until it completely uncovers the lower part of the housing 132. The operator can thus easily remove a paper container 101 (FIG. 1) which has been used and is therefore without any paper 42 and insert a fresh one.

To prevent the movable cover 14 shifting accidentally, the calculator 11 has a friction spring 151 disposed between the support 132, the base 12 and the top cover 13, which exerts a frictional action additional to the pressure exerted by the flexible tongues 137 of the support 132 on the movable cover 14. The friction spring 151 moreover exerts a force which tends to space the base 12 from the cover 13, preventing the movable cover 14 from shifting unintentionally.

Figure 9:
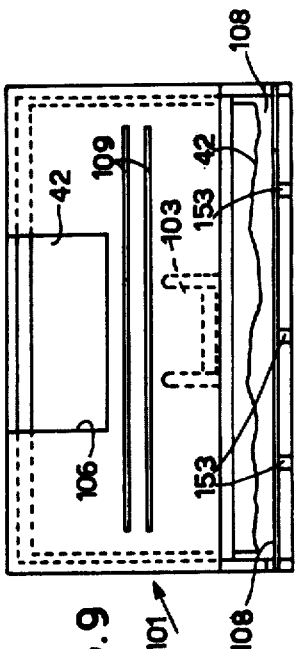
FIG. 9 is a plan view of another part of the calculator of FIG. 1.

Since the housing 132 and, the container 101 are defined by cylindrical surfaces, rotation of the container 101 in the housing 132 is avoided by the action of the ribs 153 (FIG. 9) of the flat portion 107 and the angular portion 108 on a shoulder 154 of the support 82.

Figure 3:
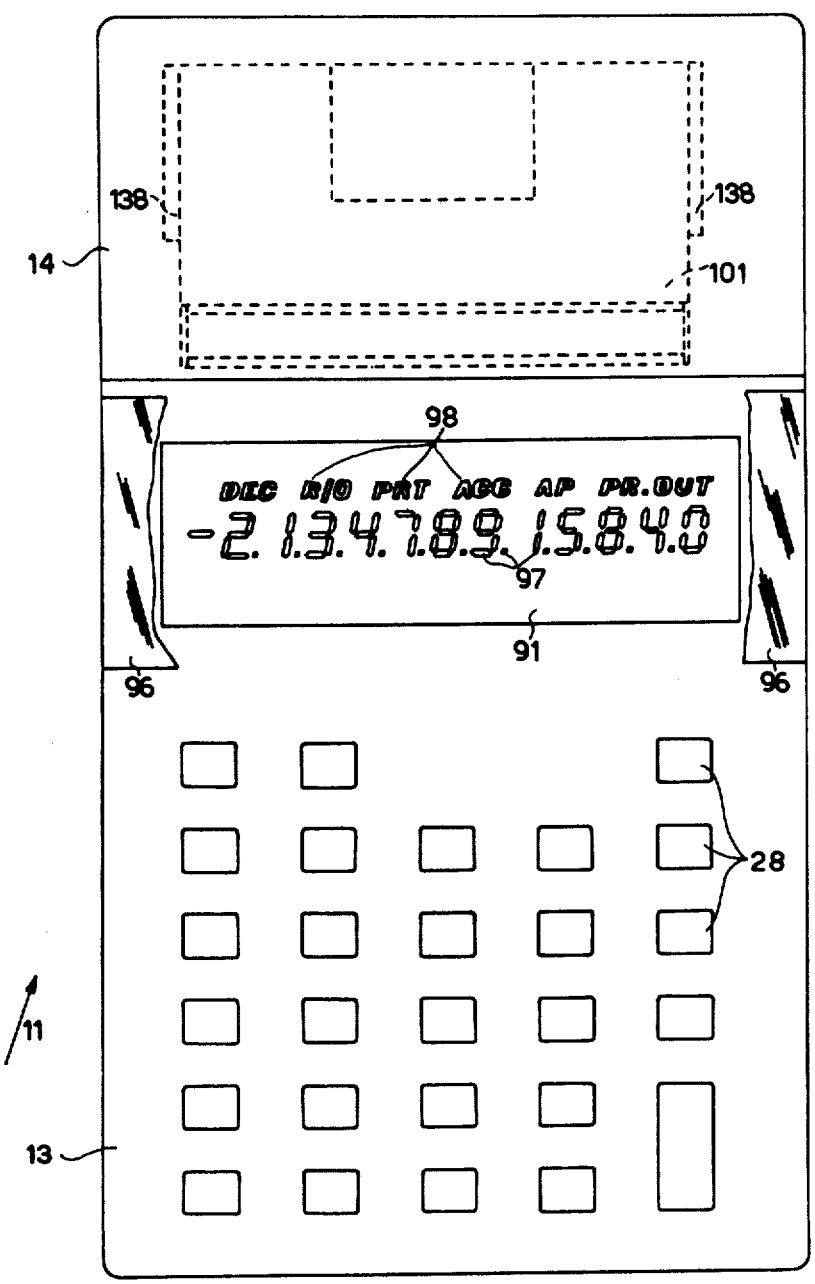
FIG. 3 is another partial plan view of the calculator of FIG. 1.

The calculator 11 operates in the following manner. With the movable cover 14 in the inoperative position, as shown in FIGS. 3 and 6, the switch 139 is open and the calculator 11 is prearranged to operate with the visual display 91 only. On pressing one of the keys 28, in addition to the visual display side the guide sign or indicator 98 PR. OUT (FIG. 3) is moreover illuminated.

By sliding the movable cover 14 to position it in the working position, it is arrested by the lugs 119 and 121 (FIG. 2) against the respective shoulders 134 and 136 of the rear support 132. The lug 126 (FIG. 6) releases the tongue 152 and causes the switch 139 to close and the switch enables the calculator 11 for printing. On pressing the keys 28 (FIG. 3), the guide sign 98 PRT appears and, at each printing cycle, the head 33 (FIG. 4) prints on the paper 42 a row of the matrix of dots of the various data through the action of the cam profile 44 which causes the slide 43 to move parallel to the platen 36. While the cam profile 63 causes the line-spacing control slide 66 to slide forward, the tongue 74 (FIG. 7) causes the wheel 76 to rotate by one step and, through the medium of the toothed wheels 78 and 79 (FIG. 5), causes the platen 36 to rotate for an elementary line-spacing movement of the paper 42. During its return travel, the slide 66 (FIG. 7), by means of the tongue 73, causes the wheel 76 and, therefore, through the medium of the wheels 78 and 79 (FIG. 5), the platen 36 to rotate by another step, completing the cycle.

As the device 46 (FIG. 1) and the cam profiles 44 and 63 rotate, the strobe disc 51 rotates and, by means of the four leaf springs 81, signals the position of the profiles 44 and 63 to the calculating unit, synchronising in this way the various movements.

To replace the paper container 101 (FIG. 4), the movable cover 14 is moved into its extra-travel position as shown in chain-dotted lines in FIG. 5. To this end, a light pressure is exerted with a finger against the projection 149 (FIG. 2) of the support 132 until the shoulders 134 and 136 are disengaged from the respective lugs 119 and 121 and the cover 14 is slid along until it is arrested by the lugs 118, 119, 121 and 122 against the back or far end of the slot 123 (FIG. 4) and by the lugs 124 and 126 against the back of the slot 127. With this movement, the tongues 128 lose their grip on the flat portions 107 of the container 101, which is free and can emerge from its housing 132.

A fresh container 101 is taken, a strip of the paper 42 is withdrawn up to the length defined by the two slots 109 and it is introduced into the support 132. The container 101 is then pushed in, guided transversely by the side portions 138 (FIG. 3), and is arrested against the shoulders 129 and 131 (FIG. 4). In this way, the strip of paper projecting from the container is disposed correctly engaged between the platen 36 and the strip element 112 for immediate feed during the subsequent operation of the calculator. The movable cover 14 is now brought back into the workingposition by bending the projection 149 (FIG. 2) until the shoulders 134 and 136 are engaged with the lugs 119 and 121. At the same time, the flexible tongues 128 (FIG. 4) engage with the bottom of the flat portion 107, holding the container 101 against the shoulders 129 and 131 and the ribs 153 against the shoulder 154 and the calculator is again ready for printing the desired data.

We claim:

1. A printing electronic calculator for printing amounts on a recording medium from a roll comprising a parallelepipedal case, including an internal housing for housing the roll, a printing unit for printing on the recording medium which unwinds from the roll, and a platen for supporting the recording medium in front of the printing unit, wherein the calculator comprises a base and a top cover having an opening with an edge adjacent to the platen and the printing unit for the passage of the recording medium to the external of the case, a movable cover guided slidably by the base and the top cover and having an edge cooperative with said opening, wherein said cover is movable between an inoperative position and a working position, wherein the edge of the movable cover in the inoperative position of the cover registers with the edge of said opening to protect the printing unit and prevent the passage of the recording medium to the external of the case and wherein said movable cover in its operative position uncovers the opening and allows the passage of the recording medium to the external of the case and wherein means are provided to prevent actuation of the printing unit by the calculating unit when the movable cover is in the inoperative position and to enable the calculating unit for printing on the recording medium from the roll when the movable cover is in the operative position.

2. A calculator according to claim 1, wherein the platen defines a printing line and causing the advance of the recording medium transversely of the printing line and the said roll is carried by a removable container housed in said internal housing and provided with guides for the lead strip of the recording medium adapted to facilitate engagement of the strip with the platen during the mounting of the container in the said internal housing.

3. A calculator according to claim 2, wherein the top cover comprises a support having two locating elements for defining the transverse position of the container with respect to the platen, and comprising at least one locating element for defining the longitudinal position of the container with respect to the platen.

4. A calculator according to claim 3, wherein the said support comprises a shoulder adapted to define the working position of the movable cover.

5. A calculator according to claim 2, wherein the internal housing comprises an opening and wherein the movable cover can be moved to an extra-travel position adapted to allow the passage of the container through the opening for installing or removing the container.

6. An electronic calculator according to claim 1, wherein the printing unit comprises a platen, which defines a printing line, a thermal printing head, a cam, a rotating member adapted to shift the head by the cam with a reciprocating movement transverse to the platen for scanning the printing line and wherein the thermal printing head and the platen are protected by the movable cover when the cover is in its inoperative position.

7. A printing electronic calculator comprising a calculating unit; a keyboard including keys for entering data and controlling arithmetic operations; a visual data display for displaying entered data and results of the operations; a printing unit operable for printing said entered data and said results on a recording medium; means defining an opening for the exit of the recording medium from the calculator; a movable cover shiftable between an inoperative position wherein said opening is closed and said printing unit is protected and an operative position wherein said opening is open; a switching element movable between a first and a second position wherein said switching element in its first position causes said printing unit not to be operative whereby there occurs the display only of said data and results and wherein said switching element in its second position causes said printing unit to be enabled to print said entered data and said results; and means on said movable cover operative on said switching element to cause said switching element to be positioned in said first position when said cover is on its inoperative position and to cause said switching element to be positioned in said second position when said cover is on its working position.

8. A printing electronic calculator comprising a calculating unit, a recording medium, a roll on which the recording medium is wound, a printing unit for printing on the recording medium which unwinds from the roll, a movable cover adapted to be shifted from an inoperative position in which it protects the printing unit and prevents actuation of the printing unit by the calculating unit, to a working position in which the cover uncovers the printing unit and enables the calculating unit for printing on the recording medium from the roll, an independent power supply, a visual data display, and a switching element which responds to the positions of the movable cover for operation of the calculator with visual display only of the data when the movable cover is in the inoperative position of the cover, further comprising a body, a pair of openings in the body and the movable cover which become aligned in the inoperative position of the cover, a plug, and a switch which normally connects the independent power supply to the calculating unit and is adapted to be actuated by the plug which can be inserted through the pair of aligned openings to disconnect the calculating unit from the supply.

9. A calculator according to claim 8, wherein the visual display comprises a series of guide signs which can be activated to indicate the prearranged positions of the movable cover.

10. A printing device comprising a printing head for printing data on a recording medium, a platen rotatable for the advance of the recording medium and provided with a toothed wheel for its rotation, a support mounting said printing head, a slide having two flexible tongues engageable with the toothed wheel, and a rotating member wherein said rotating member comprises a first cam profile for shifting the support of said printing head with a reciprocating movement transverse to the platen for scanning a printing line and a second cam profile for incremental advance of the platen and the recording medium at each scan of a printing line, wherein each of said first snd second cam profiles comprises a slotted-link type cam wherein the slotted-link type cam of the second cam profile cooperates with a cam following pin of the slide, wherein the flexible tongues of said slide are disposed diametrically opposed with respect to the toothed wheel and selectively engage a tooth of the toothed wheel for causing said toothed wheel to be rotated incrementally by one of the two flexible tongues during the forward travel and by the other of the two flexible tongues during the return travel, and wherein a strobe disc is mounted on the rotating member for sending signals indicative of the movement of the printing head and the platen.

11. A printing device according to claim 10, further comprising an electric motor whose driving shaft is parallel to the platen, wherein the slotted-link type cams of said rotating member lie on a rotating plane parallel to the platen, said rotating member is provided with a crown gear parallel to the rotating plane and wherein said driving shaft is provided with a pinion engaging the crown gear of said rotating member.

12. A printing device according to claim 11, wherein a frame comprises two side portions which support the platen, the rotating member, the printing head and the electric motor which has its axis of rotation parallel to the axis of the platen and wherein said rotating member comprises, in the lower part, a crown gear which is in mesh with the pinion of the electric motor and, in the upper part, said slotted-link type cam which actuates the reciprocating movement transverse of the printing head.

* * * * *